United States Patent
Nakamoto

(10) Patent No.: US 9,838,465 B2
(45) Date of Patent: Dec. 5, 2017

(54) NETWORK SYSTEM, DISTRIBUTION SYSTEM, CONTROL METHOD, AND STORAGE MEDIUM

(71) Applicant: CANON KABUSHIKI KAISHA, Tokyo (JP)

(72) Inventor: Hisashi Nakamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 389 days.

(21) Appl. No.: 14/554,496

(22) Filed: Nov. 26, 2014

(65) Prior Publication Data

US 2015/0180953 A1 Jun. 25, 2015

(30) Foreign Application Priority Data

Dec. 19, 2013 (JP) ................. 2013-262858

(51) Int. Cl.
*G06F 15/16* (2006.01)
*H04L 29/08* (2006.01)

(52) U.S. Cl.
CPC ................. *H04L 67/10* (2013.01)

(58) Field of Classification Search
USPC ........................................ 709/201
See application file for complete search history.

(56) References Cited

FOREIGN PATENT DOCUMENTS

JP 2003-186778 A 7/2003

*Primary Examiner* — Hee Soo Kim
(74) *Attorney, Agent, or Firm* — Fitzpatrick, Cella, Harper & Scinto

(57) ABSTRACT

A first distribution system that manages which manages a software according to a first controller of an image forming device receives a distribution reservation of a software according to a second controller from a second distribution system which manages the software according to the second controller of the image forming device. The first distribution system then searches for the software to be distributed according to the first controller, in accordance with the received distribution reservation and performs setting for distributing the software which has been found. The image forming device applies the software which has been found to itself in accordance with the acquisition of the setting.

7 Claims, 15 Drawing Sheets

FIG. 9

| Device ID | Distribution starting time | Group version to be distributed | Module name to be distributed: Version | File size |
|---|---|---|---|---|
| ZZZ00001 | 2013/10/1 9:00 | 3.1 | BOOT (Second controller): V2.1<br>M-CON (Second controller): V3.1 | 500MB |
| ZZZ00002 | 2013/10/1 9:00 | 3.1 | BOOT (Second controller): V2.1<br>M-CON (Second controller): V3.1 | 500MB |
| ZZZ00003 | 2013/10/1 9:00 | 3.1 | BOOT (Second controller): V2.1<br>M-CON (Second controller): V3.1 | 500MB |
| .. | .. | .. | .. | .. |

FIG. 10

| Module/Group version | 2.0 1102 | | 2.1 | 1103 | 3.0 | 1104 | 3.1 | 1105 | | 1106 |
|---|---|---|---|---|---|---|---|---|---|---|
| 1101 | Version | File size (MB) | Version | File size (MB) | Version | File size (MB) | Version | File size (MB) | | |
| BOOT (First controller) | 1.1 | 32 | 1.2 | 33 | 2.0 | 34 | 2.1 | 30 | | |
| BOOT (Second controller) | 1.1 | 45 | 1.2 | 40 | 2.0 | 40 | 2.1 | 50 | | |
| M-CON (First controller) | 2.0 | 390 | 2.1 | 430 | 3.0 | 430 | 3.1 | 400 | | |
| M-CON (Second controller) | 2.0 | 160 | 2.1 | 145 | 3.0 | 140 | 3.1 | 450 | | |
| ACCON (Accessory) | 1.1 | 30 | 1.1 | 23 | 1.3 | 33 | 1.4 | 34 | | |
| .. | .. | | .. | | .. | | .. | | | |

FIG. 11

| Object distribution server | Average communication speed (Mbps) | Installation required time (Minute/100 MB) |
|---|---|---|
| Second distribution server | 10Mbps | 2 minutes |

FIG. 12

| Device ID | Distribution starting time | Group version to be distributed | Module name to be distributed: Version |
|---|---|---|---|
| ZZZ00001 | 2013/10/1 9:16.7 | 3.1 | BOOT (First controller) : V2.1<br>M-CON (First controller): V3.1<br>ACCON (Accessory) : V1.4 |
| ZZZ00002 | 2013/10/1 9:16.7 | 3.1 | BOOT (First controller) : V2.1<br>M-CON (First controller): V3.1<br>ACCON (Accessory) :V1.4 |
| ZZZ00003 | 2013/10/1 9:16.7 | 3.1 | BOOT (First controller) : V2.1<br>M-CON (First controller): V3.1<br>ACCON (Accessory) : V1.4 |
| : | : | : | : |

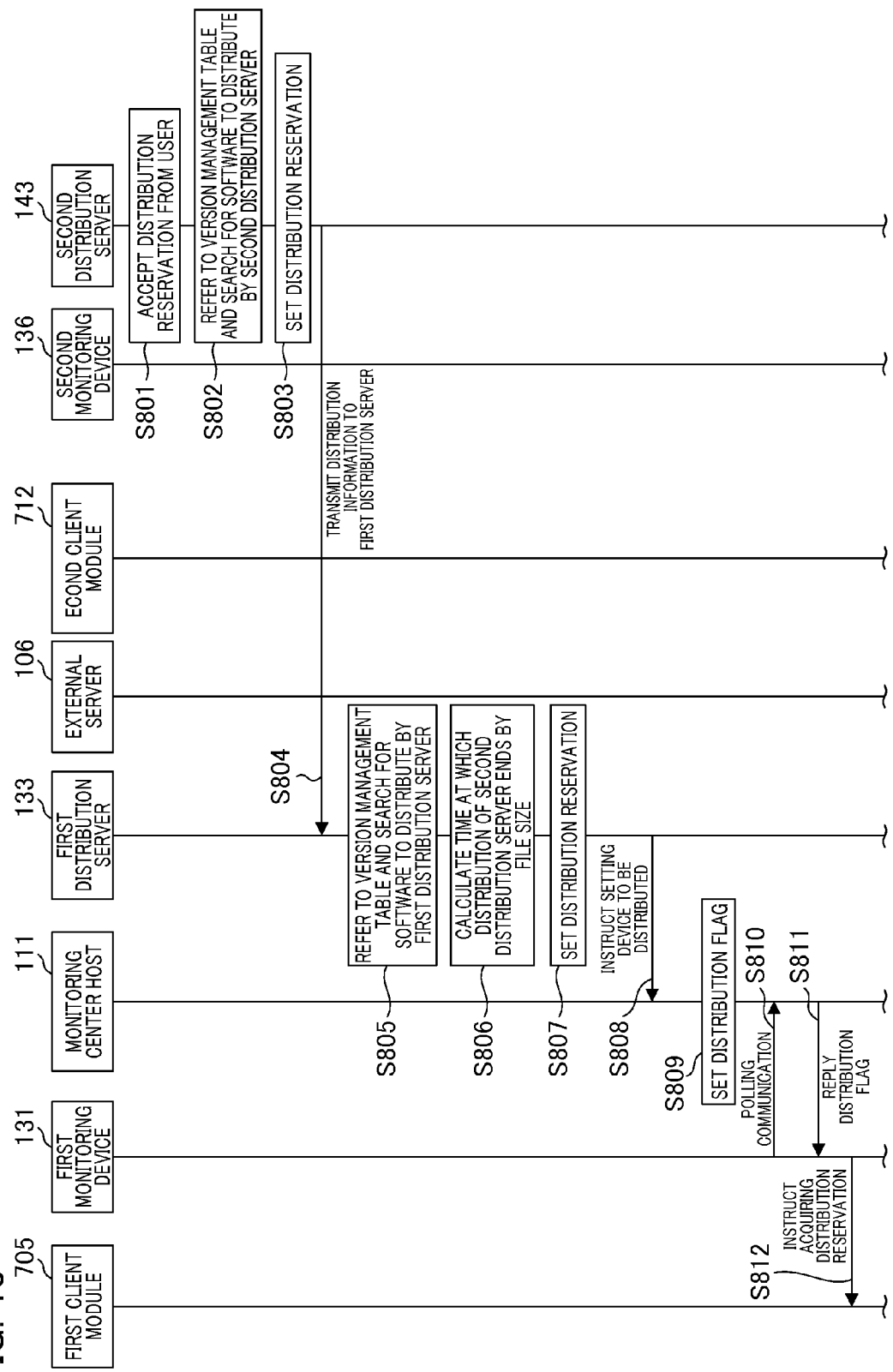

NETWORK SYSTEM, DISTRIBUTION SYSTEM, CONTROL METHOD, AND STORAGE MEDIUM

BACKGROUND OF THE INVENTION

Field of the Invention

The present invention relates to a technology that distributes software to a network device such as image forming device.

Description of the Related Art

A device that provides a function such as image processing, or the like updates software including firmware used by a controller mounted on the device in order to improve function of image processing or the like, or in the case that failure occurs. Examples of methods for updating the software include distributing from a distribution server via an internet, using update tools through an USB or intranet, or the like. When using the distribution server, a manager of the image forming device or serviceman who distributes the software designates an image forming device to be distributed on a web screen and sets a distribution date and time, to thereby execute distribution via the internet. The distribution server may distribute the software in a remote configuration to several tens of thousands of image forming devices, or may also update the software periodically at a frequency of once a week.

As described above, when the distribution server distributes the software to several tens of thousands of image forming devices, there are cases where the distribution server cannot distribute the software to all of the image forming devices at the same time by one distribution server. Japanese Patent Laid-Open No. 2003-186778 discloses a system that, by preparing a plurality of distribution servers, when a number of client terminal devices to be distributed at the same time by one distribution server is exceeded, another distribution server distributes the software. According to this system, the waiting time for the distribution of the software is shortened.

In order to extend a function provided by the image forming device, assume that a second controller is connected separately from a first controller mounted in advance on the image forming device. The second controller may be, for example, manufactured by a different manufacturer from the first controller mounted on the image forming device. Since the manufacturer is different, it is possible to provide advanced image processing functions that are characteristic to each manufacturing company. For example, when a paper weight, a paper size, a method of post-processing, or the like are taken into consideration depending on the performance of the controller, it is possible to predict the timing of the exchange of consumables or replenishment of paper as well as the printing time. Therefore, a print job can be processed efficiently and downtime can be minimized. Furthermore, a large easily operated display or the like can be connected to the elevational operation unit of the device.

The software for the image forming device that is managed by a conventional distribution server includes software for the first controller and accessory software. The second controller can be used by installing software for the second controller and an OS to execute the software for the second controller on a PC, and by connecting to the image forming device. Therefore, modules of the second controller are not supported by the distribution server. In other words, software corresponding to each of the controllers is usually supported by different servers.

By connecting the second controller to the image forming device, the overall number of the modules of the image forming device increases, and it is necessary to match the versions of the software between the first controller and the second controller. Naturally, there are risks that the image forming device does not operate normally in some combinations of the software.

Furthermore, by coordinating a plurality of the distribution servers and the servers performing batch distribution of the software, the reboot processing for the update processing on the image forming device may overlap, and thereby the update processing may fail.

SUMMARY OF THE INVENTION

The present invention provides a mechanism for, when distributing software that is applied to the image forming device by different distribution systems, distributing the software which corresponds to the software that is distributed from one of the distribution systems so as not to overlap with the application time of the other distribution system.

According to the present invention, a distribution system is a first distribution system which manages a software according to a first controller of the image forming device. The first distribution system includes: an receiving unit configured to receive, from a second distribution system which manages software according to a second controller of the image forming device, a distribution reservation of the software according to the second controller; a searching unit configured to search, in accordance with the received distribution reservation, the software according to the first controller to be distributed; and a setting unit configured to perform setting for distributing the software which has been found by the searching unit. In accordance with acquisition of the setting by the image forming device, the software which has been found is applied to the image forming device.

Further features of the present invention will become apparent from the following description of exemplary embodiments with reference to the attached drawings.

BRIEF DESCRIPTION OF THE DRAWINGS

FIG. 9 illustrates a distribution information table of the second distribution server.

FIG. 10 illustrates a version management table.

FIG. 11 illustrates an information table of the second distribution server.

FIG. 12 illustrates the distribution information table of the first distribution server.

FIG. 13 is a sequence diagram illustrating a flow of a firmware distribution processing.

DESCRIPTION OF THE EMBODIMENTS

Figure 1:
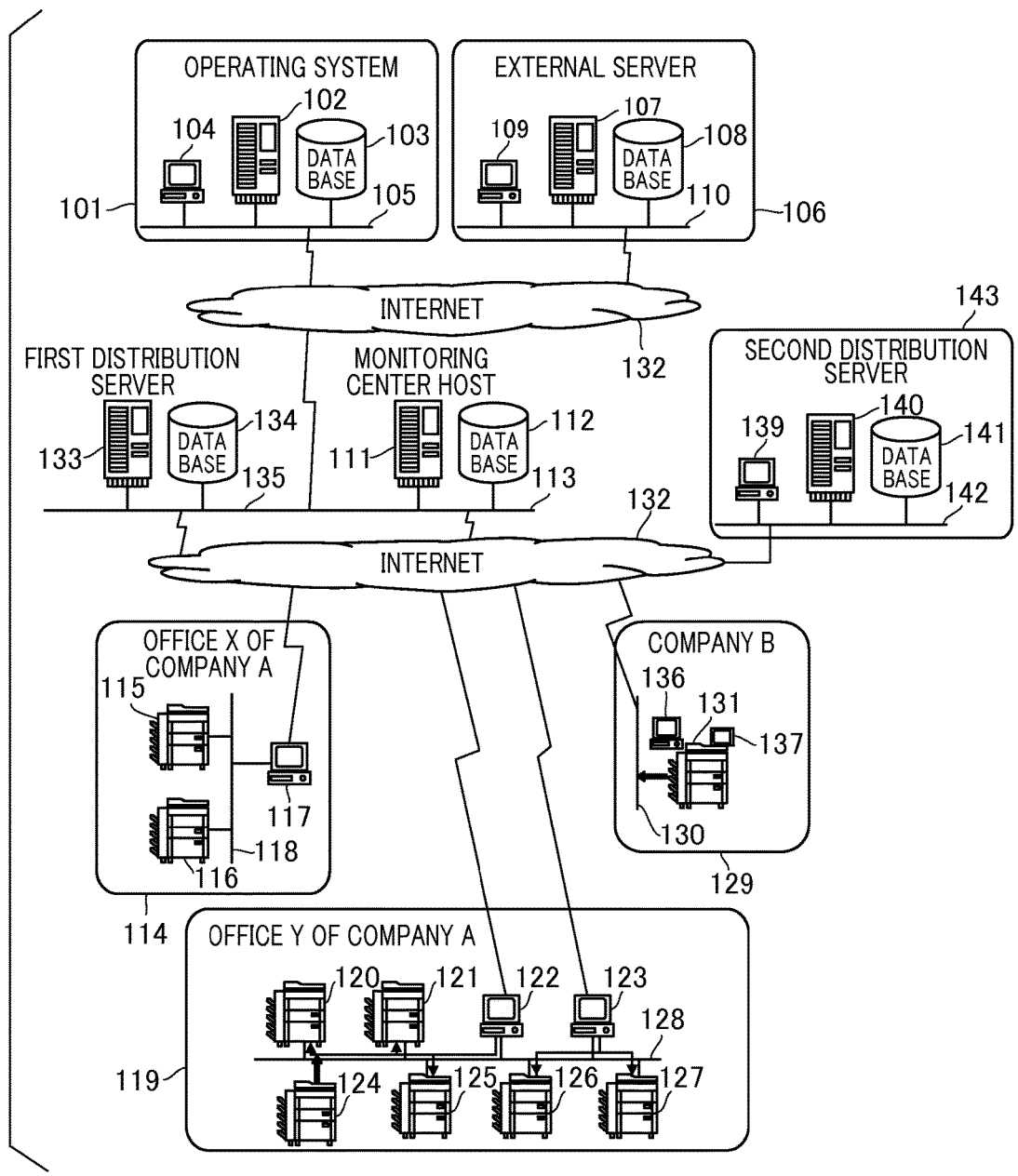
FIG. 1 illustrates an example of an overall configuration according to the present embodiment.

FIG. 1 illustrates an example of an entire configuration of a network system according to the present embodiment. The network system shown in FIG. 1 includes an operating system 101, an external server 106, a first distribution server 133, a monitoring center host 111, a second distribution server 143, and customer system 114, 119 and 129. The operating system 101 includes a database 103 and a PC 104 that performs control of the database 103, such as registering or correcting data and the like. PC 104 accesses a web site provided by the monitoring center host 111 or the distribution server 133, and thereby performs data browsing, firmware distribution reservation and the like. A host 102, the database 103, and the PC 104 are connected via a LAN 105.

Note that the network system shown in FIG. 1 is configured by a plurality of devices, but provided that the equivalent function can be achieved, the configuration is not limited thereto. For example, the database 103 may reside in the host 102 physically. Furthermore, the database 103 may reside at another place through an internet 132, as long as the host 102 can access the database 103. In other words, the network system may be configured by a plurality of devices or by one device.

The external server 106 includes a host 107, a database 108, and a PC 109. Each of the devices are connected via a LAN 110. The external server 106 has a function to provide a service for distributing a firmware of the distribution server 133 at high speed. The external server 106 distributes the software to be distributed to the device of the access source, when the device that accessed the first distribution server and acquired a URL has accessed the external server 106 based on the URL.

Next, a description will be given of the monitoring center host 111. The monitoring center host 111 is a device monitoring system having a database 112. The database 112 is a database that functions as a history storage unit which stores information for device monitoring, and a device operating state and the like. The monitoring center host 111 and the database 112 are connected by a LAN 113, and the LAN 113 is connected to the internet 132. Note that the database 112 may physically reside in the monitoring center host 111. Furthermore, the database 112 may reside in another place through an internet 132, provided that the monitoring center host 111 can access the database 112. The monitoring center host 111 has a function to collect, store, and process information of the device to be monitored or information that indicates an operating state from the monitoring device 117, 122 and 123 or device 131, and to provide warnings and the like to the outside.

Next, a description will be given of the first distribution server 133. The distribution server 133 is a distribution system that distributes firmware for the first controller to the devices. The distribution server 133, the details of which will be described below, passes the URL to the device that performed the software distribution instruction to download the software to be distributed, when the software to be distributed is present. A database 134 is a database to serve as a storage unit that stores firmware to be applied to the devices. The distribution server 133 and the database 134 are connected by a LAN 135, and the LAN 135 is connected to the internet 132. Note that the database 134 may physically reside in the distribution server 133. Furthermore, the database 134 may reside in another place through an internet 132, provided that the distribution server 133 can access the database 134. The LAN 113 and the LAN 135 may be the same, and the database 134 and the database 112 may transmit and receive data.

In FIG. 1, only one each of the monitoring center host 111, the database 112, the distribution server 133, and the database 134 are shown. However, actually, in order to collect information from many devices and monitoring devices or to perform load distribution of distributing firmware, there are cases in which distributed processing is performed by a plurality of the monitoring center host 111 and the databases.

Next, a description will be given of the second distribution server 143. The second distribution server 143 is a distribution system which distributes firmware for the second controller to the devices. The second distribution server 143 includes a PC 139, a host 140, and a database 141. The PC 139 provides, for example, a setting screen for distribution reservation of the second software. The database 141 is a database to serve as the storage unit that stores firmware to be applied to the devices. The PC 139, the host 140, and the database 141 are connected by a LAN 142, and the LAN 142 is connected to the internet 132.

Next, a description will be given of the configuration of a customer side system. The customer side system differs depending on the customers. In FIG. 1, the customer systems 114, 119, and 129 are shown. In the customer system 114 (office X of company A), the devices 115 and 116, which are connected to the LAN 118 that is connected to the internet 132, are monitored by the monitoring device 117, and the monitoring device 117 communicates with the monitoring center host 111 via the internet 132. On the other hand, in the customer system 119 (office Y of company A), the devices on the LAN 128 are managed by the monitoring devices 122 and 123. The devices 120, 121, 124, and 125 are managed by the monitoring device 122, and the devices 126 and 127 are managed by the monitoring device 123. Note that the devices are the image forming device, such as printers, and multifunction peripherals, and hereinafter are described as a "device" or a "network device".

In the customer system 129 (company B), the device 131 itself, which is connected to the LAN 130 connected to the internet 132, communicates directly with the monitoring center host 111 via the internet 132. The device 131 includes functions that are equivalent to those of the monitoring device 117, 122, and 123, and transmits its own operational information to the monitoring center host 111. In the present embodiment, the device 131 is connected to a PC 136 on which the second controller is installed that is different to the first controller that is installed on the device. The device 131 is connected to a display 137.

In the network device 131, the second controller is mounted in separate body or in a built-in form, and the display 137 is connected. The function of the monitoring device is also mounted in the second controller. In the network device 131, the first controller is also mounted similar to the network device that is installed in other customer systems. The network device 131 may be used singly under the control of the first controller, or can be used by using the second controller and the display 137 together.

For example, in the image forming device, in addition to the normal control functions such as image processing included in the first controller, the second controller is mounted as another controller to perform management of an advanced print job. Here, the management of an advanced print job denotes managing the print job by including the functions of predicting the timing of exchange of consumables or replenishment of paper as well as the printing time by taking the paper weight, the paper size, the method of post-processing, or the like into consideration. By these functions, it is possible to process the print job efficiently and to minimize downtime. Also, by using the second controller, a large easily operated display or the like can be connected to the elevational operation unit of the network device.

In the second distribution server 143, the host 140, and the database 141 are connected through the LAN 142. The second distribution server 143 has a service to distribute software for the second controller.

A further description will be given of the form for performing control of the network device 131 using the second controller by connecting other devices which include the network device 131 and the second controller. In this case, a module of the second controller and software for an OS (Operating System) to execute the module of the second controller are installed on the other device, and the other device is connected to the network device 131 for use. The software that corresponds to the second controller is not the distribution object at the first distribution server. Thus, the second distribution server 143 which supports the software that corresponds to the second controller supports services such as updating software and the like.

Figure 2:
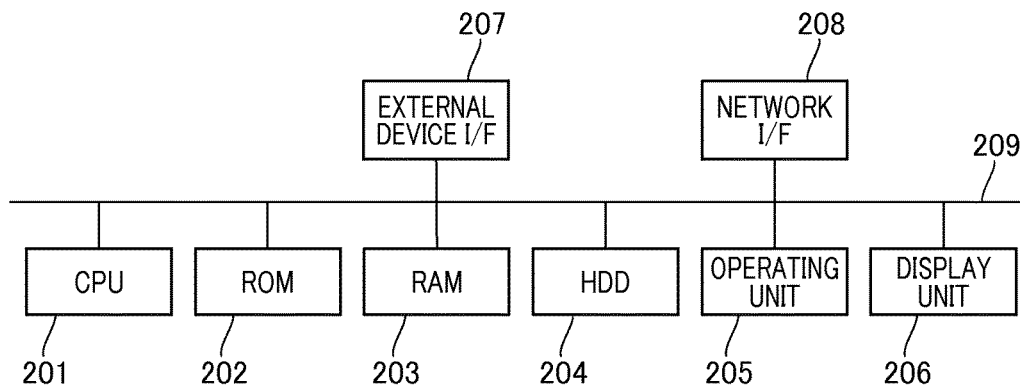
FIG. 2 illustrates an example of a hardware configuration of a monitoring center host, a distribution server, a host, a monitoring device, and a PC.

FIG. 2 illustrates a hardware configuration of the monitoring center host 111. The hardware configuration of the distribution server 133, the host 102, 107, 140, the monitoring device 117, 122, 123, and the PC 104, 109, 136, 139 are the same as that of the monitoring center host 111. As shown in FIG. 2, the monitoring center host 111 includes a CPU 201, a ROM 202, a RAM 203, a HDD 204, an operating unit 205, a display unit 206, an external device I/F 207, and a Network I/F 208. CPU is an abbreviation for "central processing unit". ROM is an abbreviation for "read only memory". RAM is an abbreviation for "random access memory". HDD is an abbreviation for "hard disk drive".

The CPU 201 controls the respective processing units on the monitoring center host 111. The ROM 202 is not rewritable, and stores data or programs related to each processing by the monitoring center host 111. The RAM 203 performs electrical storage of temporary data related to each process by the monitoring center host 111, and is rewritable. The HDD 204 stores data or programs, and temporary data related to each process by the monitoring center host 111, information related to a device to be monitored, and information collected from a device, or the like. For example, the HDD 204 stores operational information or the like. In the case of the monitoring center host 111 and the distribution server 133, the PC 104 stores programs for the processing illustrated in FIG. 4 as described below on the HDD 204. The programs use the RAM 203 as a temporary storage area, and are executed by calling by the CPU 201.

The operating unit 205 is a keyboard that receives input of commands to the monitoring center host 111. The display unit 206 displays the operating state of the monitoring center host 111, or information output by the respective programs operated on the monitoring center host 111. The network I/F 208 is connected to the internet 132 and the LAN through the network so as to exchange information with external devices. The external device I/F 207 is for connecting an external storage device or the like to the monitoring center host 111. These constituent elements are linked by a system bus 209 so as to exchange data.

Figure 3:
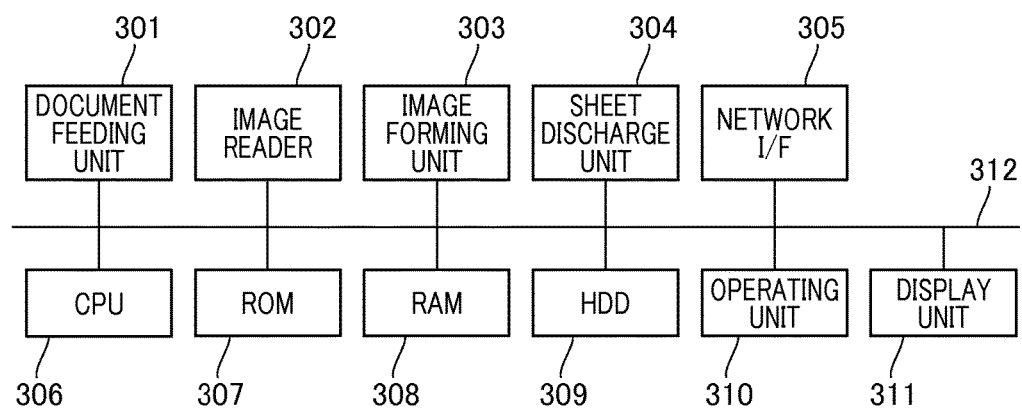
FIG. 3 illustrates an example of a hardware configuration of each of devices.

FIG. 3 illustrates a hardware configuration of respective devices 115, 116, 120, 121, 124, 125, 126, 127, and 131 that function as image forming devices according to the present embodiment. The devices specifically includes a multifunction peripheral provided integrally with a printer and facsimile functions, a printer (including an electrophotographic and injector types) that receives data from a PC or the like for printing, a scanner, and a facsimile, or the like. The figure illustrates the configuration of a multifunction peripheral as an example of a device.

An image reader 302 reads an original document on a document feeding unit 301. An image forming unit 303 converts data received from the network I/F 305 through the network or a document read by the image reader 302 to a print image, and prints out the same. The sheet discharge unit 304 discharges a sheet that has been printed out, and executes processes such as sorting and stapling. The network I/F 305 is connected to the LAN and the internet 132 through the network, and exchanges information with external devices. The CPU 306 controls each of the processing units on the device. The CPU 306 monitors the operational status of the device, and when a specific event such as a malfunction occurs, transmits status information indicating the relevant status to a predetermined destination address. The destination address includes, for example, the monitoring center host 111, the monitoring device, or the like.

The non-rewritable ROM 307 stores data or a program related to each process for the devices. The RAM 308 performs electrical storage of temporary data related to each process for the devices, and is rewritable. The HDD 309 stores data or programs, and temporary data related to each process for the devices, and user data that is transmitted to the devices, or the like. Each device stores programs for performing the processing in FIG. 5, described below, on the HDD 309. These programs use the RAM 308 as a temporary storage area and are executed by calling by the CPU 306.

An operating unit 310 receives the input of commands to the device. A display unit 311 displays the operating status of the device, or information related to an operation in relation to the operating unit 310. These constituent elements are linked by a system bus 312 for exchanging data. The device 131 that includes the function itself for transmitting information for monitoring stores data or a program related to monitoring data transmitting processing in the HDD 309 or the ROM 307.

Figure 4:
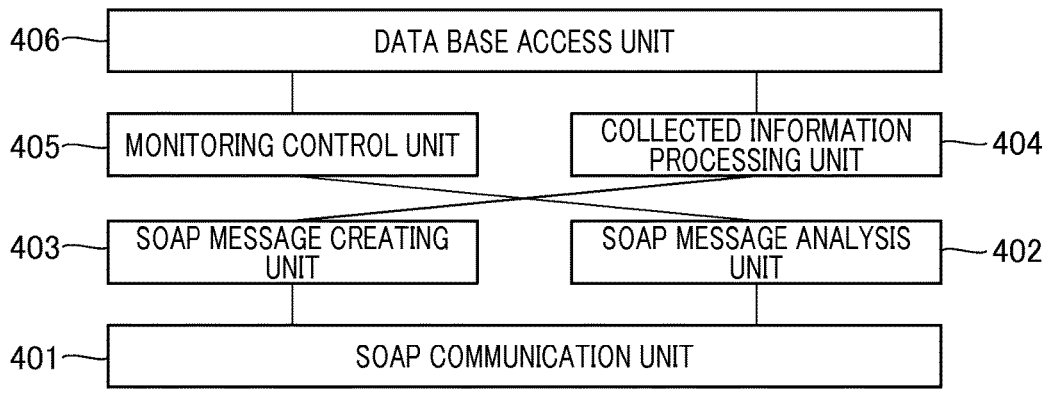
FIG. 4 illustrates an example of a software configuration of the communication portion of the monitoring center host and the distribution server.

FIG. 4 illustrates a software configuration of a communication portion of the distribution server 133 and the monitoring center host 111. A SOAP communication unit 401 passes SOAP data received from the monitoring devices 117, 122, and 123, or the device 131 via the network I/F 208 to a SOAP message analysis unit 402. Furthermore, the SOAP data created by the SOAP message creating unit 403 is transmitted to the monitoring devices 117, 122, and 123, or the device 131 via the network I/F 208.

A collected information processing unit 404 stores, without modification or processing, the information that has been received from the monitoring devices 117, 122, and 123, or the device 131, via the data base access unit 406 in the database 112 or the database 134. In the case of the monitoring center host 111, a monitoring control unit 405 performs control such as scheduling management or the like for the monitoring devices 117, 122, and 123, or the device 131. In the case of the distribution server 133, the monitoring control unit 405 performs control such as polling processing or the like for the monitoring devices 117, 122, and 123, or the device 131.

Figure 5:
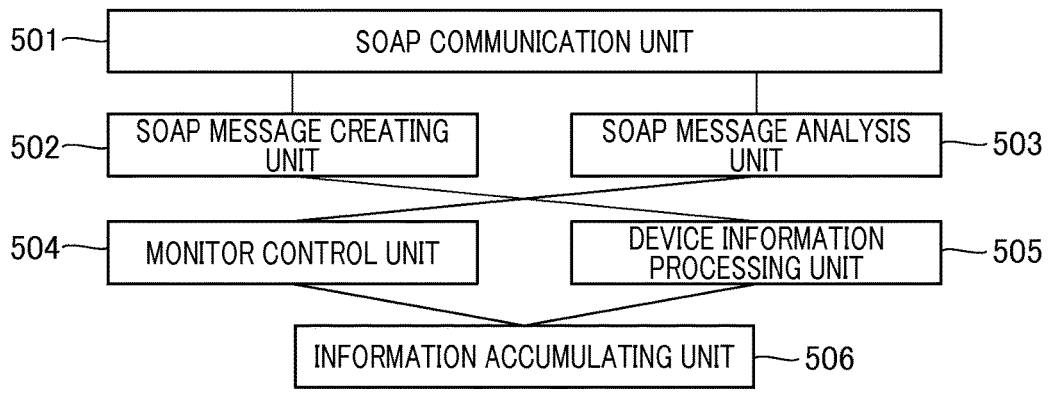
FIG. 5 illustrates an example of a software configuration of the communication portion of the monitoring device and each of the devices.

FIG. 5 illustrates a software configuration of the communication portion of the monitoring devices 117, 122, and 123, or the device 131. A SOAP communication unit 501 passes SOAP data received from the monitoring center host 111 or the distribution server 133 via the network I/F 208 to the SOAP message analysis unit 503. Furthermore, the SOAP communication unit 501 transmits the SOAP data created by the SOAP message creating unit 502 to the monitoring center host 111 or the distribution server 133 via the network I/F 208.

A monitor control unit 504 updates device information for objects to be monitored that are retained in an information accumulating unit 506, or acquires information for the device 115 and 116. A device information processing unit 505 accumulates operational information for the device in the information accumulating unit 506. The data that is accumulated in the information accumulating unit 506 is passed to the SOAP message creating unit 502 without modification via the device information processing unit 505, and is then transmitted to the monitoring center host 111.

Figure 6:
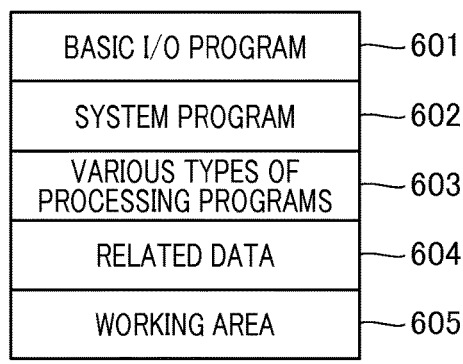
FIG. 6 illustrates an example of a configuration of a memory map.

FIG. 6 illustrates a structure of a memory map when a program is loaded onto the monitoring center host 111, the distribution server 133, the monitoring devices 117, 122, and 123 or the respective devices. When a processing program according to the present invention is executed, the monitoring center host 111 and the monitoring devices 117, 122, and 123 load a program onto the RAM 203 and the respective devices load a program onto the RAM 308.

The memory map is configured by a basic I/O program 601, a system program 602, various types of processing programs 603 including the processing program for the present embodiment, an area 604 for storage of related data, and a working area 605 for the programs. The basic I/O program 601 performs input and output of the device. The system program 602 provides an operational environment for each of the processing programs.

Figure 7:
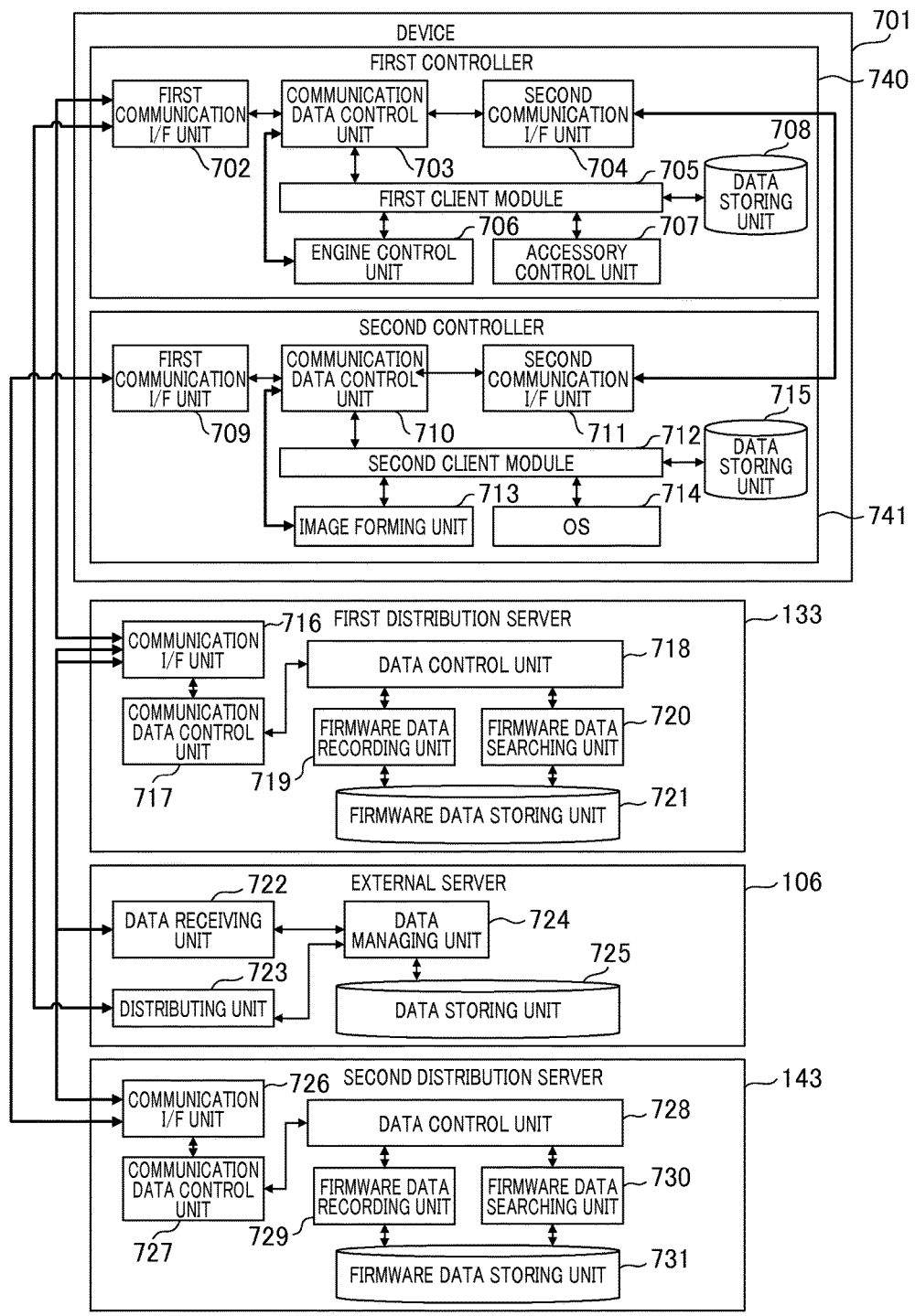
FIG. 7 illustrates an example of a software configuration of the software related to the present invention.

FIG. 7 illustrates a block diagram of respective software configured to realize a network system according to the present invention. The device 131 shown in FIG. 7 includes a first controller 740 in the device and indicates a state in which a second controller 741 installed on the PC 136 is connected to the device 131. The first controller 740 includes a first communication I/F unit 702, a communication data control unit 703, a second communication I/F unit 704, a first client module 705, an engine control unit 706, an accessory control unit 707, and a data storing unit 708.

The first communication I/F unit 702 controls communication with the first distribution server 133 and with the external unit server 106. The communication data control unit 703 controls communication data received from the first communication I/F unit 702 and the second communication I/F unit 704. The second communication I/F unit 704 controls communication with the first controller 740 and the second controller 741. The first client module 705 plays a role of receiving software from the external server 106 based on URL information received from the first distribution server 133, and thereby installs the software on the engine control unit 706 or the accessory control unit 707. The data storing unit 708 is used as a storage area for software data in the first controller or temporary storage area.

The second controller 741 includes a first communication I/F unit 709, a communication data control unit 710, a second communication I/F unit 711, a second client module 712, an image forming unit 713, an OS 714, and a data storing unit 715. The first communication I/F unit 709 controls communication of the second controller with the second distribution server 143. The communication data control unit 710 controls communication data received from the first communication I/F unit 709 and the second communication I/F unit 711. The second communication I/F unit 711 controls communication of the first controller 740 with the second controller 741. The second client module 712 plays a role of receiving software from the second distribution server 143 and thereby installs the software on the image forming unit 713 or the OS 714. The data storing unit 715 is used as a storage area for software data in the second controller or temporary storage area.

The first distribution server 133 includes a communication I/F unit 716, a communication data control unit 717, a data control unit 718, a firmware data recording unit 719, a firmware data searching unit 720, and a firmware data storing unit 721. The communication I/F unit 716 controls communication of the first controller 740 of the network device with the first distribution server 133. The communication data control unit 717 controls communication data received from the communication I/F unit 716. The data control unit 718 controls data in the first distribution server. The firmware data recording unit 719 records software information in the firmware data storing unit 721. The firmware data searching unit 720 searches software from the firmware data storing unit 721. The firmware data storing unit 721 stores firmware data for distribution in the first distribution server. The firmware data storing unit 721 stores software for the engine control unit 706 and the accessory control unit 707 as an object.

The external server 106 includes a data receiving unit 722, a distributing unit 723, a data managing unit 724, and a data storing unit 725. The external server 106 has a service for distributing the software of the first distribution server 133 at high speed, and the software data is periodically transferred by the first distribution server. The data receiving unit 722 receives the software data transferred from the first distribution server. The distributing unit 723 distributes data recorded in the data storing unit 725 to the first controller 740 at high speed. The data managing unit 724 makes the data storing unit 725 store the data received from the data receiving unit 722. Furthermore, the data managing unit 724 supplies data for distribution to the distributing unit 723. The data storing unit 725 stores various data by receiving instruction from the data managing unit 724.

The second distribution server 143 includes a communication I/F unit 726, a communication data control unit 727, a data control unit 728, a firmware data recording unit 729, a firmware data searching unit 730, and a firmware data storing unit 731. The communication I/F unit 726 controls communication of the second controller 741 of the network device with the second distribution server 143. The communication data control unit 727 controls communication data received from the communication I/F unit 726. The data control unit 728 controls data in the second distribution server. The firmware data recording unit 729 records software information in the firmware data storing unit 731. The firmware data searching unit 730 searches software from the firmware data storing unit 731. The firmware data storing unit 731 stores firmware data for distribution in the second distribution server. The firmware data storing unit 731 stores software for the image forming unit 713 and the OS 714 as an object.

Figure 8:
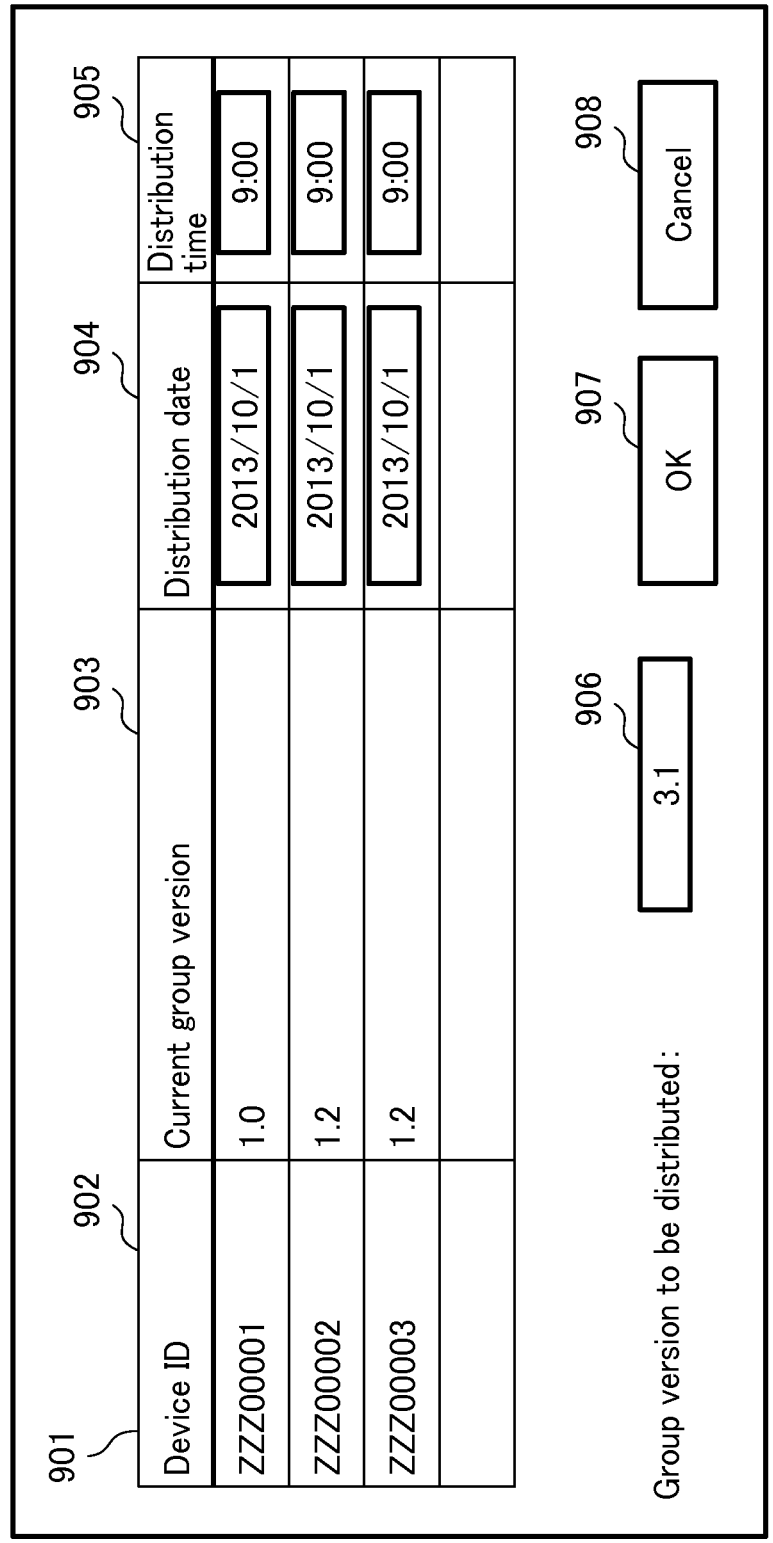
FIG. 8 illustrates a distribution reservation screen which is a web screen of the distribution server.

FIG. 8 illustrates a distribution reservation screen 901 which is provided as a web screen by the PC 139 of the second distribution server 143. A user uses this web screen for distribution reservation. A device ID 902 indicates a network device ID for the network device that is an object of the distribution reservation. A current group version 903 indicates a group version that is currently applied to the network device. The group version is a version in which all combinations of the module's version are integrated and represented as a one version. A distribution date 904 and a distribution time 905 are items to designate a distribution date and a distribution time respectively for distributing software to the network device.

The group version to be distributed 906 indicates a group version that can be distributed to the device to be distributed when the distribution reservation has been accepted from the user. Normally, the latest version is designated, but any group version can be designated. An OK button 907 is a button for applying the content of the distribution reservation. A cancel button 908 is a button for cancelling the content of the distribution reservation. In this example, the distribution reservation screen 901 is described as a screen provided by the second distribution server 143, but the distribution reservation screen 901 may be provided by a first PC (not shown).

FIG. 9 illustrates a distribution information table 1001 of the second distribution server 143. The second distribution server 143 creates the distribution information table 1001 based on the content of the reservation which the user has reserved by the distribution reservation screen 901, and makes the DB 141 retain the table. A device ID 1002 indicates a network device ID for the network device which is an object of the distribution reservation. A distribution starting time 1003 indicates a starting time which the user has reserved by using the distribution reservation screen 901. A group version to be distributed 1004 indicates a group version which the user has reserved by using the distribution reservation screen 901. A module name to be distributed 1005 indicates modules to be distributed corresponding to the group version to be distributed and versions of those modules. The second distribution server 143 refers to the version management table shown in FIG. 9, and determines the module it will distribute by itself. In file size 1006, a total value (sum) of the file size of the modules to be distributed is stored. The file size of each of the modules is recorded in the version management table 1101.

FIG. 10 illustrates the version management table 1101. The version management table 1101 indicates the version management table which is a suitable combination that is recorded both in the first distribution server 133 and the second distribution server 143. This table is stored in the DB 134 and the DB 141 of the distribution server 133 and 143. This table, as shown in 1102, indicates the group version in rows and each module in columns. In this example, the group versions 1103 to 1106 are indicated. In the column of each group version, a corresponding version of the module and the file size are recorded. Note that the first distribution server 133 and the second distribution server 143 shares the same information as the version management table 1101, and the table is periodically updated by both of the distribution servers.

FIG. 11 illustrates an information table 1201 of the second distribution server 143. In the object distribution server 1202, a server name that is responsible for the distribution is stored. Since the first distribution server 133 refers to this table, the object is the second distribution server 143. An average communication speed 1203 indicates the average communication speed when distributing the software by the second distribution server 143 in Mbps (bits per second). According to the present embodiment, the second distribution server 143 has the average communication speed of 10 Mbps. An installation required time 1204 indicates the required time for installing the software that is distributed from the second distribution server to the image forming device. According to the present embodiment, the device installs 100 MB of software per minute.

FIG. 12 illustrates the distribution information table 1301 which is included in the DB 134 of the first distribution server 133. The first distribution server 133 retains the notified distribution information when the distribution information is notified by the second distribution server 143. A device ID 1302 indicates the network dive ID for the network device which is an object of the distribution reservation. A distribution starting time 1303 indicates a starting time of the first controller 740. A group version to be distributed 1304 indicates a group version that is distributed to the device. In a module to be distributed 1305, the module to be distributed corresponding to the group version to be distributed 1304 and the version are stored. The first distribution server 133 refers to the version management table shown in FIG. 9, and determines the module it will distribute by itself and the distribution starting time.

FIG. 13 is a sequence diagram illustrating software distribution processing according to the present invention. In this sequence, an example in which the second controller 741 is connected to the network device and the software is distributed to both the first controller 740 and the second controller 741 is shown. When the second controller is mounted on the network device by connecting the second controller as a different device from the network device, the different device will be the second monitoring device. The details of the processing will be described using the flowcharts in FIG. 15 to FIG. 19, and the general features of the software distribution processing will be described with the sequence. The CPU 201 and 306, which are the CPU of each of the devices that performs the processing, loads programs stored on the ROM 202 and 307 or the HDD 204, 309 into the RAM 203 and 308, and executes them so that the sequence below is realized. Also, in the description below, it is assumed that the devices that perform the processing communicate with the customer side system of the company B.

In S801, the second distribution server 143 accepts the distribution reservation 901 from the user. In S802, the second distribution server 143 refers to the version management table 1101 and searches the software to be distributed by the second distribution server 143. In S803, the second distribution server 143 sets the distribution reservation to the distribution information table 1001 shown in FIG. 9. In S804, the second distribution server 143 transmits the distribution information set in the distribution information table 1001 and an information table 1201 shown in FIG. 11 to the first distribution server 133.

In S805, the first distribution server 133 refers to the version management table 1101 and retrieves, by using the distribution information that is reported in S804, the software which the first distribution server 133 distributes. In S806, the first distribution server 133 refers to the information table 1201 and calculates time at which the distribution of the second distribution server 143 ends by using total value (sum) of the file size of the distribution information. In S807, the first distribution server 133 sets the distribution information table 1301 (FIG. 12) of the first distribution server as a distribution reservation.

In S808, the first distribution server 133 instructs the monitoring center host 111 to set the network device ID of the network device to be distributed as the distribution network device. Accordingly, the setting for distribution is performed at the first monitoring device 131 which the first monitoring device 131 that functions as the monitoring module for the image forming device polls. Specifically, in S809, the monitoring center host 111 sets a distribution flag for the response of the first monitoring device 131. The distribution flag is for indicating that information for distribution exists. If the distribution flag is set, the first monitoring device 131 instructs the first client module 705 to query the distribution server.

In S810, the first monitoring device 131 performs confirmation of the distribution flag to the monitoring center host 111. In S811, the monitoring center host 111 returns the distribution flag to the first monitoring device 131. In S812, the first monitoring device 131 instructs the first client module 705 to acquire the distribution reservation.

Figure 14:
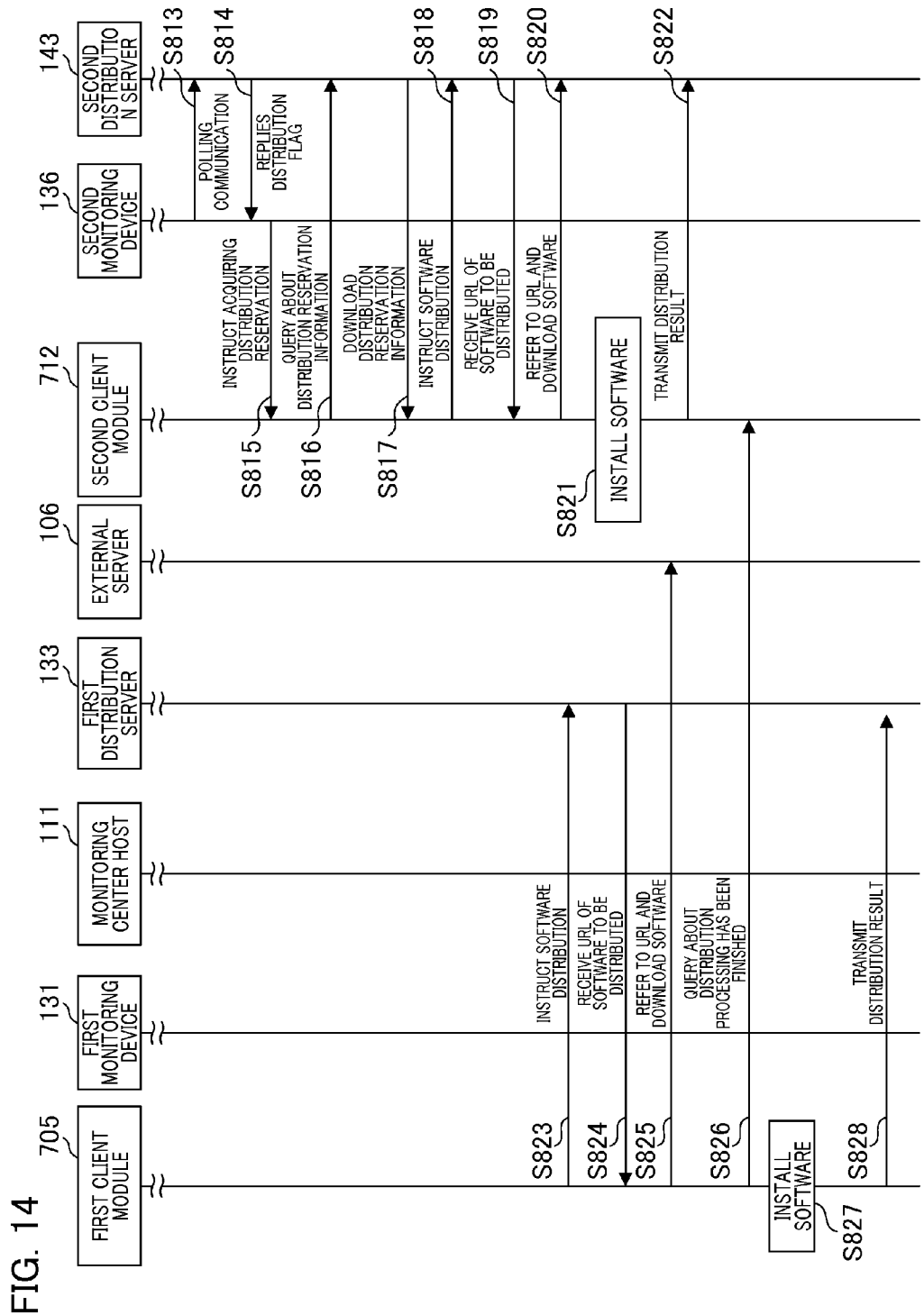
FIG. 14 is a sequence diagram illustrating a flow of the firmware distribution processing.

Next, in S813 shown in FIG. 14, the second monitoring device 136 performs confirmation of the distribution flag to the second distribution server 143. In S814, the second distribution server 143 returns the distribution flag as a response to the second monitoring device 136. In S815, the second monitoring device 136 instructs the second client module 712 to acquire the distribution reservation. In S816, the second client module 712 queries the second distribution server 143 for the distribution information.

In S817, the second client module 712 downloads the distribution information from the second distribution server 143 and sets the distribution information. In S818, the second client module 712 instructs the second distribution server 143 to distribute software. In S819, the second client module 712 receives the URL of the software to be distributed from the second distribution server 143. In S820, the second client module 712 refers to the URL and downloads the software from the second distribution server 143. In S821, the second client module 712 installs the downloaded software. In S822, the second client module 712 transmits the distribution result to the second distribution server 143.

In contrast, in S823, the first client module 705 performs software distribution instruction at the first distribution server 133. In S824, the first client module 705 receives the URL of the software to be distributed from the first distribution server 133. In S825, the first client module 705 refers to the URL and downloads the software from the external server 106 to the HDD.

In S826, the first client module 705 queries the second client module 712 about whether the distribution processing has been finished. In S827, if the query result of the S826 indicates that the distribution has finished, the first client module 705 installs the software. In S828, the first client module 705 transmits the distribution result to the first distribution server 133.

Figure 15:
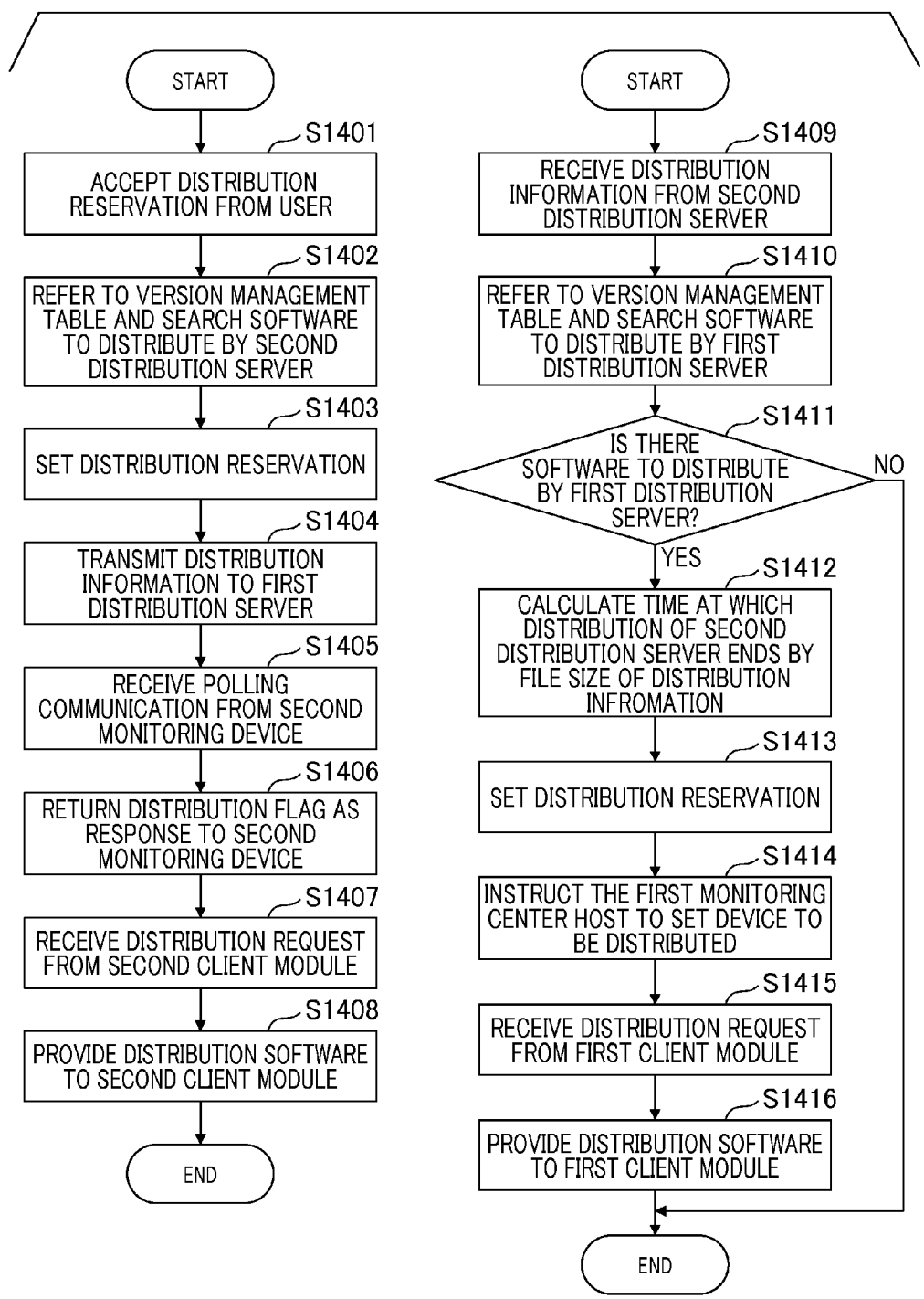
FIG. 15 illustrates a reservation accepting flow of the distribution server.

FIG. 15 illustrates a reservation accepting flow of the distribution server. In S1401 to S1408, the processing performed by the second distribution server 143 is illustrated. In S1401, the second distribution server 143 accepts the distribution reservation from the user. The user performs the distribution reservation by using the distribution reservation screen 901 provided by the second distribution server 143 and specifies the device ID to be distributed, the distribution date, the distribution time, and the group version of the software to distribute.

In S1402, the second distribution server 143 refers to the version management table 1101 and searches the software to distribute, based on the group version specified by the distribution reservation screen 901. As a search result, the module to be distributed becomes V2.1 of BOOT (the second controller) and V3.1 of M-CON (the second controller), which is associated with the group version V3.1. Accordingly, the second distribution server 143 determines the distribution information as follows and records the distribution information to the distribution information table 1001. Here, as an example, the following distribution reservation has been performed.
<Distribution Information>
Distribution date: 2013/10/1
Distribution time: 9:00
Group version of the software to distribute: 3.1
Module to be distributed: BOOT (the second controller) V2.1,
M-CON (the second controller) V3.1

In S1403, the second distribution server 143 sets the distribution reservation based on the information determined in S1402. This content is reflected in the distribution information table 1001 of the second distribution server. Note that when the setting has been completed, the second distribution server 143 sets the distribution flag. In S1404, the second distribution server 143 transmits the distribution information which is recorded in the distribution information table 1001 of the second distribution server to the first distribution server 133.

In S1405, the second distribution server 143 receives the polling communication from the second monitoring device 136. In S1406, the second distribution server 143 returns the distribution flag as a response to the second monitoring device 136. In S1407, the second distribution server 143 receives a distribution request from the second client module 712. In S1408, the second distribution server 143 provides the distribution software to the second client module 712.

S1409 to S1416 illustrates a flow of a processing performed by the first distribution server. In S1409, the first distribution server 133 receives the distribution information from the second distribution server 143. In S1410, the first distribution server 133 refers the version management table 1101 based on the group version specified by the distribution information and searches for software that the first distribution server 133 distributes. The first distribution server 133 searches for the software combination which matches with the software combination distributed from the second distribution server 143. Specifically, in case of the present embodiment, the group version to be distributed is 3.1. Therefore, as a searching result in S1410, the module to be distributed is determined as BOOT (the first controller) V2.1, M-CON (the first controller) V3.1, ACCON (accessory) V1.4.

In S1411, the first distribution server 133 proceeds to S1412 when the first distribution server 133 has determined that there is software that can be distributed, or ends the processing when the first distribution server 133 has determined that there is no software that can be distributed. In S1412, the first distribution server 133 calculates the time at which the distribution of the second distribution server 143 ends by using the received information table 1201 and the file size of the distribution information.

The first distribution server 133 refers to the received information table 1201 and calculates distribution required time from average communication speed of the second distribution server 143 and the file size by using the following equation.

$$\text{Distribution file size (MB)}/(\text{the average communication speed of the second distribution server (Mbps)}/8) = \text{distribution required time(s)} \quad \text{(Equation 1)}$$

Accordingly, since the average communication speed of the second distribution server is 10 Mbps, the distribution file size is 500 MB, the distribution required time would be 400 seconds≈6.7 minutes.

Next, the first distribution server 133 calculates time which the network device requires to install after the distribution by using the second distribution server information table 1201. Referring to the installation required time 1204, the installation required time for 100 MB of software is 2 minutes. Therefore, installation required time for 500 MB of software can be calculated as 10 minutes. Accordingly, 6.7 minutes+10 minutes=16.7 minutes will be the distribution required time.

In S1413, the first distribution server 133 sets the distribution reservation based on the result of S1412. This content is reflected in the distribution information table 1301 of the first distribution server.
<Distribution Information>
Distribution date: 2013/10/1
Distribution time: 9:16.7
Group version of the software to distribute: 3.1
Module to be distributed: BOOT (the first controller) V2.1, M-CON (the first controller) V3.1, ACCON (accessory) V1.4

In S1414, the first distribution server 133 instructs the monitoring center host 111 to set the network device ID 1302 of the network device to be distributed as an object network device of the distribution reservation. In S1415, the first distribution server 133 receives a distribution request from the first client module 705. In S1416, the first distribution server 133 provides a URL for the distribution to the first client module 705.

Figure 16:
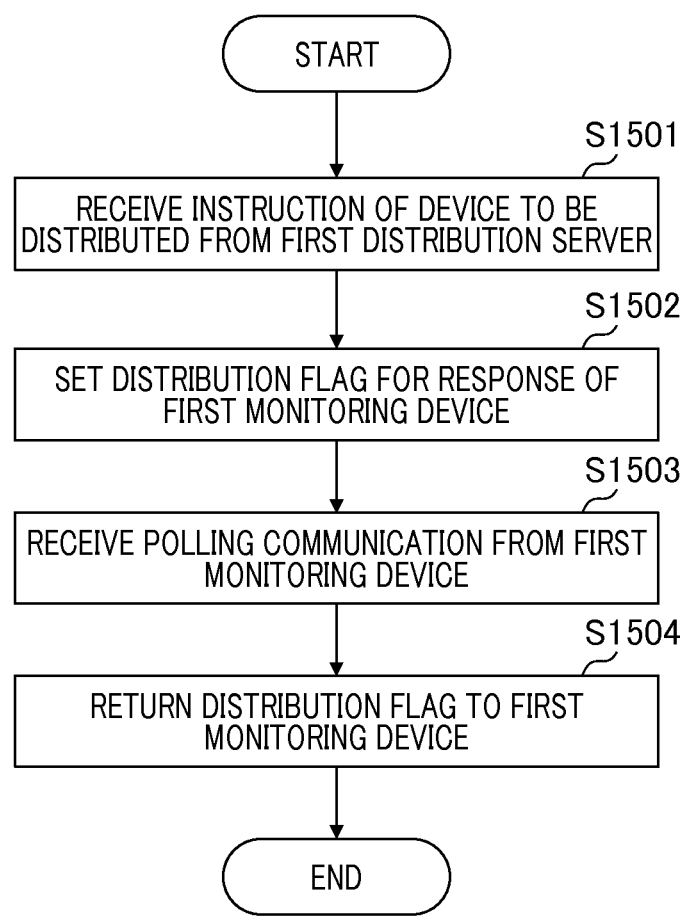
FIG. 16 illustrates a flow of the monitoring center host.

FIG. 16 illustrates a processing flow of the monitoring center host 111. In S1501, the monitoring center host 111 receives the device ID 1302 to be distributed from the first distribution server 133. In S1502, the monitoring center host 111 sets the distribution flag for the response of the first monitoring device 131. The distribution flag is for indicating that information for distribution exists. In S1503, the monitoring center host 111 receives the polling communication from the first monitoring device 131. In S1504, the monitoring center host 111 returns the distribution flag has been set to the first monitoring device 131.

Figure 17:
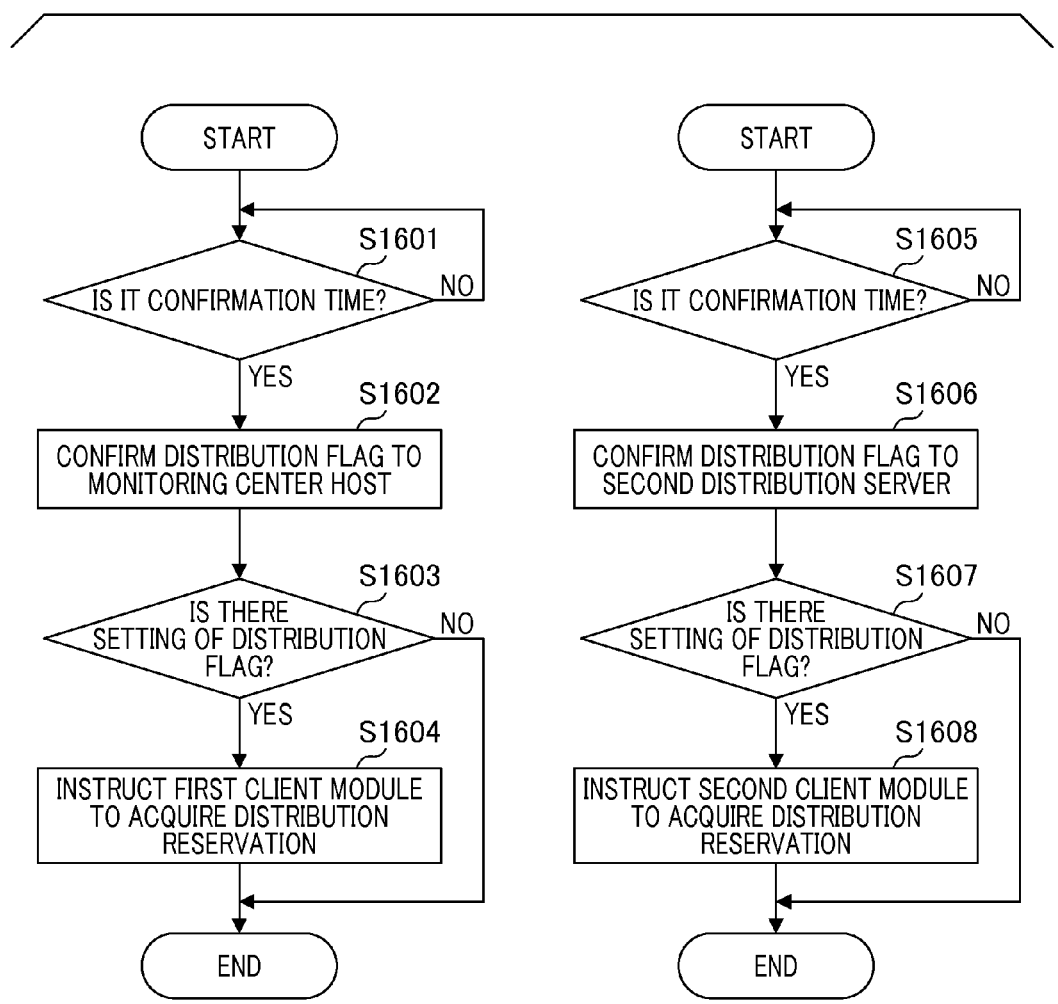
FIG. 17 illustrates a polling processing flow of the monitoring device.

FIG. 17 illustrates the polling processing flow of the monitoring device. The monitoring device performs polling confirmation periodically with the monitoring center host 111 or the second distribution server 143. S1601 to S1604 illustrates the processing flow of the first monitoring device 131. In S1601, the first monitoring device 131 determines whether it is a confirmation time for polling or not. When it is the confirmation time, the process proceeds to S1602, and when it is not, then the processing waits. In S1602, the first monitoring device 131 performs confirmation of the distribution flag with the monitoring center host 111. In S1603, if the setting of the distribution flag is received as a response of the monitoring center host 111 then the first monitoring device 131 proceeds to S1604, and if the distribution flag is not received, then the processing is ended. In S1604, the first monitoring device 131 instructs the first client module 705 to acquire the distribution reservation.

S1605 to S1608 illustrates the processing flow of the second distribution server 143. In S1605, the second monitoring device 136 determines whether it is a confirmation time for polling or not. When it is the confirmation time, the process proceeds to S1606, and when it is not, then the processing waits. In S1606, the second monitoring device 136 performs confirmation of the distribution flag with the second distribution server 143. In S1607, if the setting of the distribution flag is received as a response of the second distribution server 143, the second monitoring device 136 proceeds to S1608, and if the distribution flag is not received, then the processing is ended. In S1608, the second monitoring device 136 instructs the second client module 712 to acquire the distribution reservation.

Figure 18:
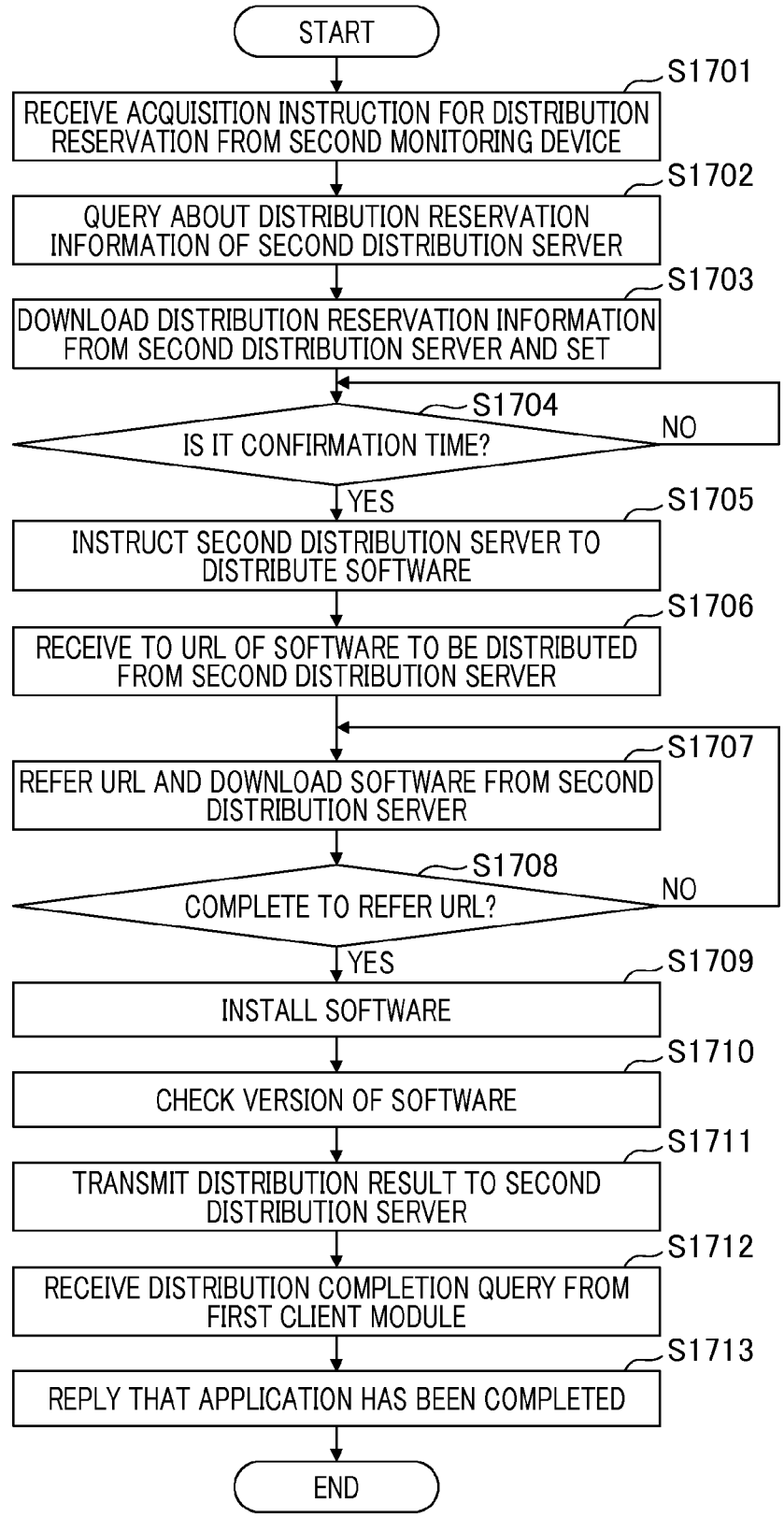
FIG. 18 illustrates an installation flow performed by a first client module.

FIG. 18 illustrates the software installation flow of the second client module. In S1701, the second client module 712 receives the acquisition instruction of the distribution reservation from the second monitoring device 136. In S1702, the second client module 712 queries the second distribution server 143 for the distribution reservation information. In S1703, the second client module 712 downloads the distribution reservation information from the second distribution server 143 and sets the distribution reservation information. In S1704, the second client module 712 confirms whether it is the distribution time or not.

In S1705, the second client module 712 instructs the second distribution server 143 to distribute software. In S1706, the second client module 712 receives the URL of the software to be distributed from the second distribution server 143. In S1707, the second client module 712 refers the URL and downloads the software from the second distribution server 143. In S1708, the second client module 712 completes referring to the URL. In S1709, the second client module 712 installs the software.

In S1710, the second client module 712 checks the version of the software. In S1711, the second client module 712 transmits the distribution result to the second distribution server 143. In S1712, the second client module 712 receives a distribution completion query from the first client module 705. In S1713, the second client module 712 replies that an application has been completed.

Figure 19:
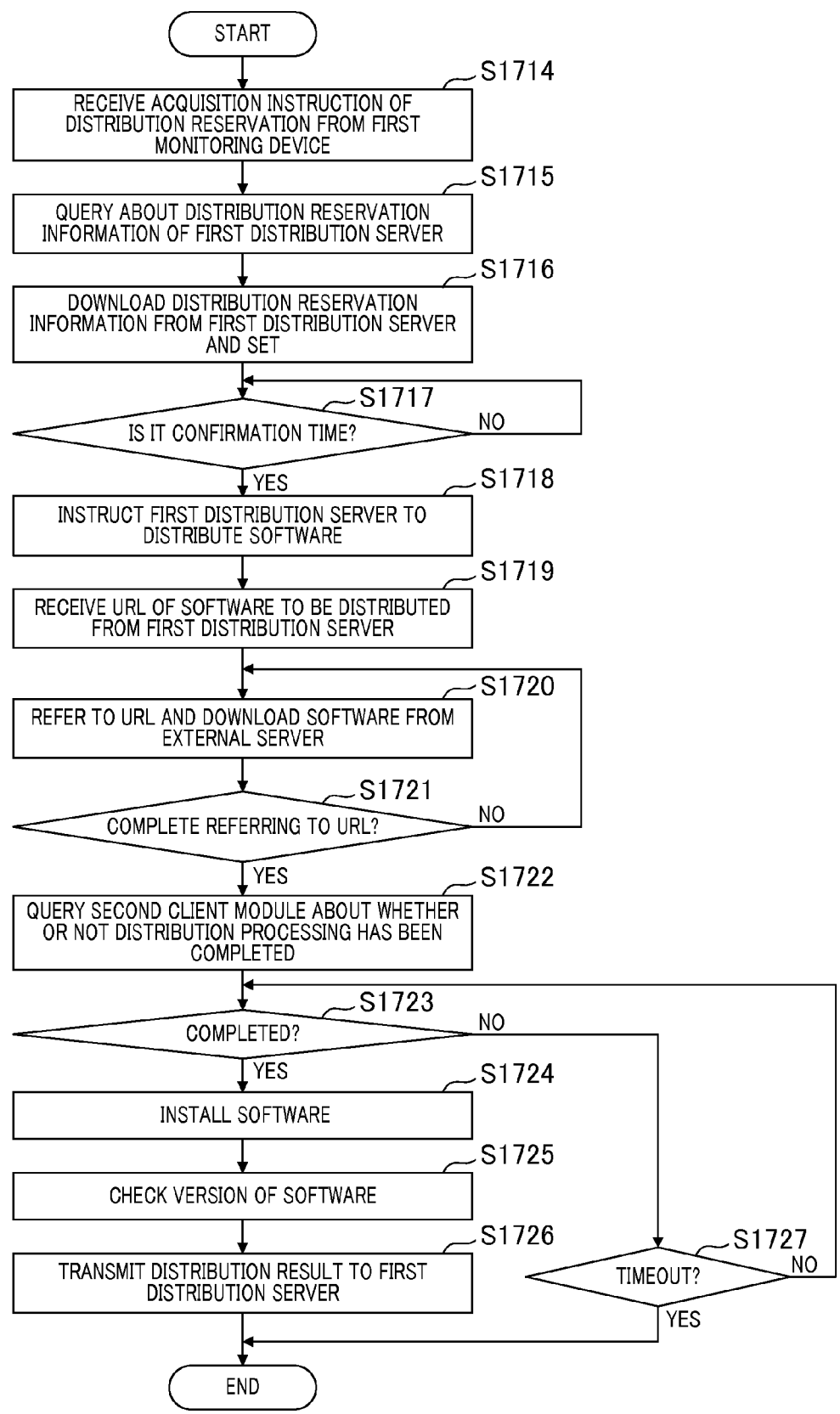
FIG. 19 illustrates an installation flow performed by a second client module.

FIG. 19 illustrates the software installation flow of the first client module. In S1714, the first client module 705 receives the acquisition instruction of the distribution reservation from the first monitoring device 131. In S1715, the first client module 705 queries the first distribution server 133 about the distribution reservation information. In S1716, the first client module 705 downloads the distribution reservation information from the first distribution server 133 and sets the distribution reservation information. In S1717, the first client module 705 determines whether it is the distribution time or not. When it is the distribution time, the process proceeds to S1718, and when it is not then the process waits.

In S1718, the first client module 705 instructs the first distribution server 133 to distribute software. In S1719, the first client module 705 receives the URL of the software to be distributed from the first distribution server 133. In S1720, the first client module 705 refers to the URL and downloads the software from the external server 106 to the HDD. In S1721, if the URL reference is completed, the process proceeds to S1722, and if not completed then the process returns to S1720.

In S1722, the first client module 705 queries the second client module 712 whether or not the distribution processing has been completed. In S1723, the first client module 705 determines whether the distribution processing of the second client module 712 has been completed, and if it has been determined to be completed, the process proceeds to S1724, and if it has been determined not to be completed, then the process proceeds to S1727. In S1724, the first client module 705 installs the software.

In S1725, the first client module 705 performs version check of the software. In S1726, the first client module 705 transmits the distribution result to the first distribution server 133. In S1727, the first client module 705 determines whether timeout or not, and if timeout then the process ends. If not timeout then the process returns to S1723.

As described above, according to the present invention, when distributing software which is applied to the image forming device by the different distribution system, it is possible to prevent distributing the software which corresponds to the software that is distributed from one of the distribution systems from being overlapped with the application time of the other distribution system. After distributing the software of the second controller, the software of the first controller is distributed at suitable time. Therefore, it is possible to prevent reboot processing from overlapping.

In the present embodiment described above, the distribution reservation from the user is accepted in the second distribution server 143 as an example. Naturally it is possible to accept the distribution reservation from the user in the first distribution server 133 by using the screen shown in FIG. 8. In this case, the first distribution server 133 calculates time at which the distribution of the first distribution server ends by using the file size of the software for which the reservation is accepted. And based on the calculated distribution time, the configuration may be similar to the second distribution server 143 setting the distribution time to distribute the corresponding software and transmitting the setting information to the second distribution server 143. In case of starting the distribution by the second distribution server 143 after the first distribution server 133 has completed the distribution, the processing in S826 would be querying the first distribution server 133 about whether or not the software installation has finished, by the second distribution server 143.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-262858, filed Dec. 19, 2013, which is hereby incorporated by reference herein in its entirety.

What is claimed is:

1. A network system that includes (i) a first distribution system which manages software for a first controller that controls image forming on an image forming device, the first distribution system comprising a first memory and a first processor, (ii) a second distribution system which manages software for a second controller for management of print processing on the image forming device, the second distribution system comprising a second memory and a second processor, and (iii) the image forming device, which receives software to be distributed from the first distribution system and the second distribution system, wherein the second memory stores instructions and the second processor is capable of executing the instructions stored in the second memory to cause the second distribution system to:

(a) search for the software to be distributed according to the second controller, and (b) transmit, to the first distribution system, a distribution reservation of the software, according to the second controller, which has been found, wherein the first memory stores instructions and the first processor is capable of executing the instructions stored in the first memory to cause the first distribution system to:

(a) perform a further search, in accordance with the distribution reservation, which has been received from the second distribution system, for the software to be distributed according to the first controller, and (b) perform setting for distributing the software which has been found in the further search, and wherein, after the software to be distributed according to the second controller has been received, the image forming device applies the software which has been found in the further search, in accordance with acquisition of the setting.

2. A control method of a network system that includes (i) a first distribution system which manages software for a first controller that controls image forming on an image forming device, (ii) a second distribution system which manages software for a second controller for management of print processing on the image forming device, and (iii) the image forming device which receives software to be distributed from the first distribution system and the second distribution system, the control method comprising:

searching, by the second distribution system, for the software to be distributed according to the second controller and transmitting, to the first distribution system, a distribution reservation of the software, according to the second controller, which has been found;

performing a further search, by the first distribution system, in accordance with the distribution reservation, which has been received from the second distribution system, for the software to be distributed according to the first controller;

performing setting, by the first distribution system, for distributing the software which has been found in the further search; and applying, by the image forming device, after the software to be distributed according to the second controller has been received, the software which has been found in the further search, in accordance with acquisition of the setting.

3. The network system according to claim 1, wherein the instructions stored in the first memory further cause the first distribution system to:

calculate a time at which the distribution by the second distribution system ends by using a file size included in the distribution reservation of the software according to the second controller, and set, as the setting for the distribution, distribution time at which the software which has been found is distributed after the time at which the distribution ends.

4. The network system according to claim 1, wherein, in the image forming device, the software which has been found in the further search is applied after the received software according to the second controller has been applied.

5. The network system according to claim 3, wherein a time from a start to a completion of the distribution of the software according to the second controller by the second distribution system includes the time at which the image forming device downloads, from the second distribution system, the software according to the second controller and the time required for applying the downloaded software to the image forming device.

6. The network system according to claim 1, wherein the network system further includes a monitoring center host which manages information for monitoring the image forming device and an operating state of the image forming device, wherein the setting for the distribution of the software that has been found in the further search is performed to the monitoring center host that is polled by a monitoring module of the image forming device, and wherein the image forming device acquires the setting for the distribution of the software from the monitoring center host as a response to the polling by the monitoring module.

7. The network system according to claim 1, wherein, in accordance with the distribution reservation, which has been received, a combination of versions of the software that is searched for in the further search and is to be distributed, according to the first controller, matches with a combination of versions of the software according to the second controller.

* * * * *